United States Patent [19]

Ream

[11] 3,857,965

[45] Dec. 31, 1974

[54] METHOD FOR MAKING A CHEWING-GUM COMPOSITION

[75] Inventor: Ronald L. Ream, North Aurora, Ill.

[73] Assignee: Wm. Wrigley, Jr. Company, Chicago, Ill.

[22] Filed: Oct. 11, 1973

[21] Appl. No.: 405,711

[52] U.S. Cl. .................................................. 426/3
[51] Int. Cl. ............................................ A23g 3/00
[58] Field of Search ........................... 426/3, 4, 5, 6

[56] References Cited
UNITED STATES PATENTS

| | | | |
|---|---|---|---|
| 3,262,784 | 7/1966 | Bucher.................................... | 426/5 |
| 3,352,689 | 11/1967 | Bilotti..................................... | 426/3 |
| 3,655,866 | 4/1972 | Bilotti..................................... | 426/3 |

*Primary Examiner*—Samih N. Zaharna
*Assistant Examiner*—J. M. Hunter

[57] ABSTRACT

A method for making a chewing-gum composition comprising the steps of melting crystalline sorbitol or concentrating a sorbitol solution by heating, mixing chewing-gum base and a crystallization retardant with the sorbitol, homogeneously blending and then forming the mixture. The composition, which is manufactured in a liquid state, can be formed to the desired shape either by casting into a mold or by productforming after cooling to a viscous state.

14 Claims, No Drawings

METHOD FOR MAKING A CHEWING-GUM COMPOSITION

BACKGROUND OF THE INVENTION

1. Field of the Invention

This invention relates to a novel method for manufacturing a chewing-gum composition.

2. Description of the Prior Art

Conventional chewing-gum compositions known to applicant are generally manufactured by first mixing gum base with a sugar sweetener, coloring and flavoring; then rolling the mixture into a thin slab; and finally accurately scoring the slab and breaking apart chewing-gum sticks to fit individual packages. Such conventional compositions are generally susceptible to crystallization or other deterioration upon standing, due primarily to loss of moisture. Furthermore, conventional compositions are hygroscopic and become tacky in a humid climate, resulting in adhering problems. Moisture loss and adhering problems require the inclusion of a moisture barrier such as aluminum foil or wax paper in the individual chewing-gum packages.

German Pat. No. 2,115,461, which issued on Oct. 12, 1972, discloses a process for manufacturing chewing-gum which requires mixing gum base with fat and/or wax ingredients and sweetening, coloring and flavoring additives at an elevated temperature and then casting the mixture into the desired shape. The fat and wax serve as a mastic or binding agent. Chewing-gum products made by this process do not have to be individually packaged, because they are practically non-hygroscopic. However, although this process applies to sugarless chewing-gum products, it is particularly suitable for chewing-gum products which contain sugar.

U.S. Pat. No. 2,460,695, which issued Feb. 1, 1949, discloses a candy chewing-gum having a hard, candy-like appearance and a longer shelf life than conventional chewing-gum products. However, this process requires mixing gum base with sugar in its hot liquid state, thereby resulting in a mixture which is too viscous to be cast; it must be extruded or pulled to produce the final gum product. Furthermore, the sugar chars upon heating in its liquid state.

SUMMARY OF THE INVENTION

The present invention is directed toward an improved method for making a sugarless chewing-gum composition which can be formed either by casting into a mold or by product-forming after cooling to a more viscous state, without the use of fat and wax ingredients. Chewing-gum produced according to the present invention has a low moisture content, with the result that re-crystallization does not occur upon standing. Such chewing-gum is free from adhering problems and hence is easy to package; it can be packaged and sold in bulk quantities without the need for individual stick packages. Since such chewing-gum is castable, it is economically adapted to a variety of conventional packaging machines.

In general, the present invention is an improved method for making a chewing-gum composition comprising the steps of melting crystalline sorbitol (a well-known sugarless sweetener) or concentrating a sorbitol solution by heating, mixing chewing-gum base and a crystallization retardant with the melted sorbitol, homogeneously blending the mixture, and forming the mixture to the desired shape either by casting into a mold or by product-forming after cooling to a viscous state.

The present invention, unlike prior methods for making chewing-gum known to applicant, is based upon the melting of crystalline sorbitol at a temperature of approximately 200° Fahrenheit, or concentrating an aqueous sorbitol solution by heating. Sorbitol does not char in its liquid state. In contrast, sugar (sucrose) becomes very viscous upon heating beyond its melting point, thereby preventing casting of sugar-containing chewing-gum products; furthermore, moisture is required to prevent heated sugar from charring. The present invention does not utilize fat and wax ingredients as a mastic agent. Instead, a crystallization retardant is included to provide the proper consistency and to insure long shelf life. The crystallization retardant used in the method of the present invention preferably comprises mannitol, glycerine or an emulsifier such as gum acacia. The emulsifier is also desirably included to facilitate mixing the chewing-gum base with the sorbitol. Coloring the flavoring in conventional types and levels are also desirably included.

It is an important object of this invention to provide an improved method for making a sugarless chewing-gum composition that can be formed either by casting into a mold or by product-forming in a viscous state.

Another important object of the present invention is to provide a method for making a castable chewing-gum without fat and wax ingredients.

A still further object of this invention is to provide a method for making a chewing-gum composition which has a long shelf life.

Still another important object of this invention is to provide a chewing-gum product which is easy and economical to package.

Numerous other object and advantages of the invention will be apparent from the following description, which discloses a preferred method thereof.

DESCRIPTION OF THE PREFERRED METHOD

In general, as noted earlier, chewing-gum is manufactured according to the present invention by melting crystalline sorbitol or concentrating a sorbitol solution by heating, mixing chewing-gum base and a crystallization retardant with the melted sorbitol, homogeneously blending the mixture, and forming the mixture to the desired shape either by casting the liquid mixture into a mold or by product-forming after cooling to a viscous state. The present invention utilizes crystalline sorbitol, a well-known sugarless sweetener, which, as noted earlier, assumes a thin liquid condition and does not char upon heating to its melting point. Mixing melted sorbitol or a concentrated sorbitol solution with conventional chewing-gum base results in a liquid chewing-gum product which can be formed to the desired shape in either a liquid or a viscous state. The addition of a crystallization retardant is necessary to prevent the chewing-gum product from re-crystallizing and hence becoming crumbly upon standing. An emulsifier can be included to facilitate mixing the gum base with the sorbitol; it is desirable, but not essential to the composition, since the mixing can be accomplished by physical emulsion. Coloring and flavoring in conventional types and levels are also desirably included.

Specifically, the chewing-gum composition manufactured according to the present invention comprises the following ingredients: chewing-gum base, from 14–40% by weight, sorbitol, from 10–86% by weight; moisture, from 0–10% by weight; and from 0.5–50% by weight one or more of an emulsifier, mannitol or glycerine. The emulsifier, mannitol and glycerine individually range respectively from 0–15%, 0–25% and 0–10% by weight of the total composition. In addition, conventional coloring and flavoring ingredients can be added to the foregoing composition in amounts ranging respectively from 0–10% and 0.1–4% by weight thereof. Within the specified ranges, the optimum levels of the chewing-gum ingredients are determined empirically.

Any conventional type of chewing-gum base can be used; examples are available under the trademarks "Dreyco," "Ladco," "Ideal," or combinations of natural chicle and artificial rubbers. The emulsifier preferably comprises gum acacia since it does not soften the chewing-gum base; however, glycerol monostearate or other conventional emulsifiers may be substituted. Sorbitol, mannitol and glycerine are well-known commercially available ingredients and need no further description. Any conventional color and flavoring may be utilized.

With respect to the above-mentioned ingredients of one or more of the emulsifier, mannitol and glycerine, too little of those ingredients in the chewing-gum composition results in re-crystallization thereof upon standing and hence a crumbly chewing-gum product having a limited shelf life. Too much gum acacia results in a product that tastes too waxy. Too much mannitol is unduly expensive and prevents the product from setting properly. Too much glycerine also prevents the product from setting. The glycerine replaces moisture found in conventional chewing-gum products. It is well known that a chewing-gum product having a high moisture content crystallizes and becomes crumbly when the moisture dries out upon standing. In the chewing-gum composition made according to the present invention, the percentage of moisture can be reduced by correspondingly adding glycerine. However, the addition of glycerine may necessitate the addition of sorbitol seed crystals into the liquid chewing-gum mixture to facilitate solidification, as will be described later.

The preferred formula for the chewing-gum ingredients is as follows:

| Ingredient | Percent by Weight |
| --- | --- |
| Gum base | 25.0 |
| Sorbitol | 64.6 |
| Moisture | 0.5 |
| Gum Acacia (emulsifier) | 2.0 |
| Mannitol | 3.0 |
| Glycerine | 3.5 |
| Coloring | 0.1 |
| Flavoring | 1.3 |

The method or process for making the chewing-gum according to the present invention specifically comprises the following steps, utilizing amounts of ingredients within the foregoing specified ranges.

First, a mixture of sorbitol and mannitol is melted by heating, preferably to a temperature of approximately 250° Fahrenheit.

Second, the glycerine and gum base are added to and mixed with the foregoing sorbitol and mannitol mixture as it cools to a temperature in the range of 190°–250° Fahrenheit, preferably 240°. An aqueous solution of the gum acacia emulsifier is also added to the mixture.

Third, the mixture is sufficiently agitated to homogeneously blend the ingredients.

Fourth, the mixture is formed to the desired shape at a temperature in the range of 40°–200° Fahrenheit. The forming can be accomplished by casting or depositing the mixture into a mold using conventional equipment; alternatively, conventional product-forming equipment can be used to shape the mixture after it has cooled to a more plastic or viscous state.

The coloring and flavoring are added to the mixture in a known manner, the flavoring being added at a temperature depending upon its ability to withstand heat, but preferably at approximately 220° Fahrenheit.

In the alternative, an aqueous solution of the gum acacia emulsifier can be added to and mixed with aqueous solutions of the sorbitol and mannitol instead of the foregoing first step, the liquid mixture of the emulsifier, sorbitol and mannitol being then concentrated by heating to a desired moisture content which, as noted earlier, lies within the range of 0–10% by weight of the entire chewing-gum composition. For this alternative, the gum acacia solution is not added at the second step.

As a further alternative, if no emulsifier is included in the composition, the third step requires physical emulsion to properly mix the sorbitol with the gum base. No modification of the foregoing procedure is required if the mannitol and/or glycerine are omitted entirely; as noted earlier, however, the amount of one or more of the emulsifier, mannitol and glycerine must lie between 0.5 and 50% by weight of the total composition comprising chewing-gum base, sorbitol, moisture and the emulsifier, mannitol and glycerine.

As noted earlier, the inclusion of glycerine may necessitate the addition of sorbitol seed crystals sprinkled into and blended with the mixture at a temperature in the range of 70°–220° Fahrenheit to facilitate solidification of the mixture upon cooling.

I claim:

1. A method for making a chewing-gum composition comprising the steps of:
    melting crystalline sorbitol by heating;
    mixing chewing-gum base and a crystallization retardant with said sorbitol;
    homogeneously blending the mixture; and
    forming the mixture.

2. The method of claim 1 wherein the forming is accomplished by casting the mixture into a mold.

3. A method for making a chewing-gum composition comprising the steps of:
    combining aqueous solutions of sorbitol and a crystallization retardant;
    concentrating the combination by heating;
    mixing chewing-gum base with the combination;
    homogeneously blending the mixture; and
    forming the mixture.

4. The method of claim 3 wherein the forming is accomplished by casting the mixture into a mold.

5. A method for making a chewing-gum composition comprising the steps of:
    melting a combination of crystalline sorbitol and mannitol by heating, said sorbitol and mannitol ranging respectively from 10–86% and 0–25% by weight of said composition;
    mixing an emulsifier solution, glycerine and chewing-gum base with said combination at a temperature in the range of 190°–250° Fahrenheit; said emulsifier solution consisting of an aqueous solution of an emulsifier ranging from 0–15% by weight of said composition; said glycerine ranging from 0–10% by weight of said composition; the combination of said emulsifier, mannitol and glycerine ranging from 0.5–50% by weight of said composition; said chewing-gum base ranging from 14–40% by weight of said composition;

homogeneously blending the mixture; and forming the mixture at a temperature in the range of 40°–200° Fahrenheit.

6. The method of claim 5, and the additional step of adding coloring and flavoring to the mixture, said coloring and flavoring ranging respectively from 0–10% and 0.1–4% by weight of said composition.

7. The method of claim 5 and the additional step of adding sorbitol seed crystals to the mixture at a temperature in the range of 70°–220° Fahrenheit to facilitate solidification thereof.

8. The method of claim 5 wherein said forming is accomplished by casting the mixture into a mold.

9. The method of claim 5 wherein said emulsifier comprises gum acacia.

10. A method for making a chewing-gum composition comprising the steps of:

combining aqueous solutions of sorbitol, mannitol and an emulsifier; said sorbitol, mannitol and emulsifier ranging respectively from 10–86%, 0–25% and 0–15% by weight of said composition;

concentrating by heating the combination to a moisture content in the range of 0–10% by weight of said composition;

mixing glycerine and chewing-gum base with said combination at a temperature in the range of 190°–250° Fahrenheit; said glycerine ranging from 0–10% by weight of said composition; the combination of said emulsifier, mannitol and glycerine ranging from 0.5–50% by weight of said composition; said chewing-gum base ranging from 14–40% by weight of said composition;

homogeneously blending the mixture; and forming the mixture at a temperature in the range of 40°–200° Fahrenheit.

11. The method of claim 10 and the additional step of adding coloring and flavoring to the mixture, said coloring and flavoring ranging respectively from 0–10% and 0.1–4% by weight of said composition.

12. The method of claim 10 and the additional step of adding sorbitol seed crystals to the mixture at a temperature in the range of 70°–220° Fahrenheit to facilitate solidification thereof.

13. The method of claim 10 wherein said forming is accomplished by casting the mixture into a mold.

14. The method of claim 10 wherein said emulsifier comprises gum acacia.

* * * * *